Feb. 10, 1925.
A. C. WOOD
ASH RECEIVER
Filed Dec. 30, 1922
1,525,486
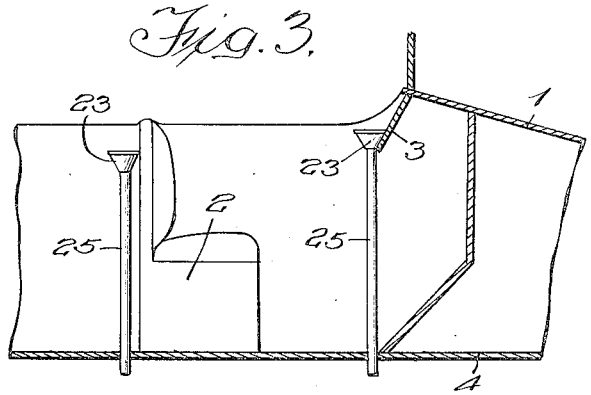
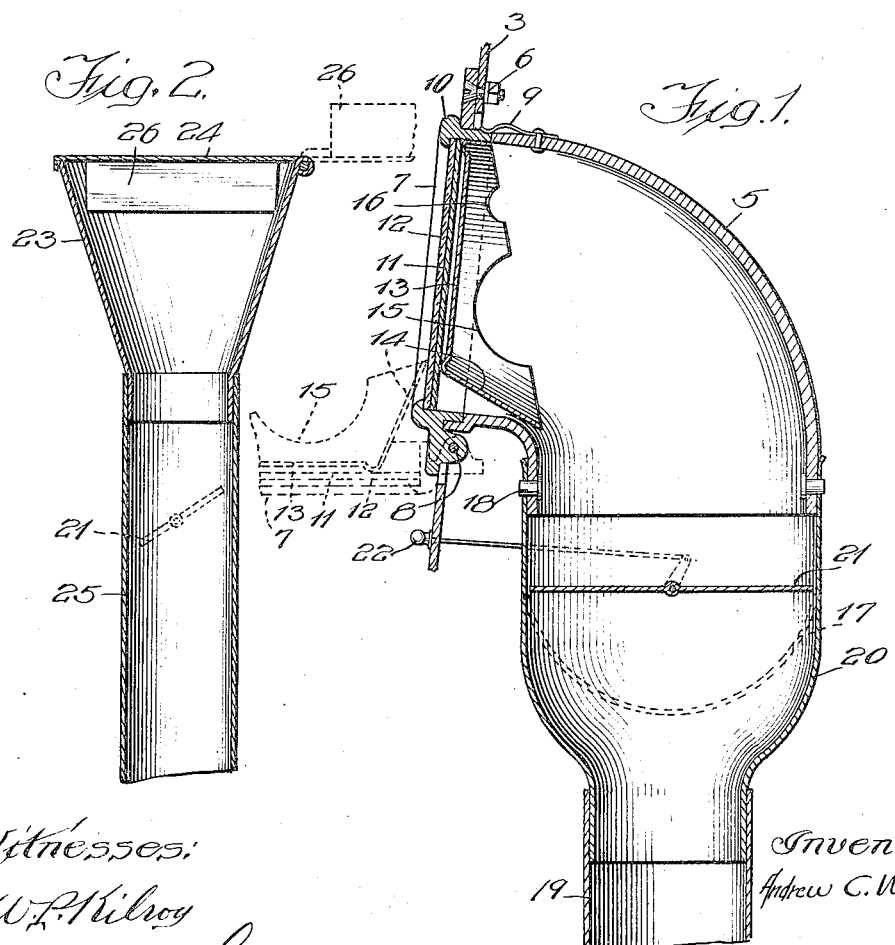
Witnesses:
W. F. Kilroy
Harry R. L. White
Inventor:
Andrew C. Wood
By Hill & Higgins Attys Patented Feb. 10, 1925.

1,525,486

UNITED STATES PATENT OFFICE.

ANDREW C. WOOD, OF CHICAGO, ILLINOIS.

ASH RECEIVER.

Application filed December 30, 1922. Serial No. 609,917.

*To all whom it may concern:*

Be it known that I, ANDREW C. WOOD, a citizen of the United States, residing at Chicago, in the county of Cook and State of Illinois, have invented certain new and useful Improvements in Ash Receivers, of which the following is a description.

My invention relates to improvements in ash receivers and more particularly to an ash receiver or ash tray adapted to be mounted on and carried by a motor vehicle or the like so that one may empty ashes thereinto without leaving his seat.

Another object of my invention is to provide an ash receiver of the kind described which shall be self-cleaning, so that after it is once installed no attention need be given it for cleaning, emptying or the like.

Another object of my invention is to provide an ash tray of the kind described, which may be mounted flush on the instrument board or panel board of the motor vehicle, so as to be inconspicuous thereon.

The invention has among its other objects the production of a device of the kind described which is extremely neat and attractive in appearance, simple, convenient, compact, durable, reliable, efficient and satisfactory for use wherever found applicable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 1 is a vertical section through one type of my device;

Fig. 2 is a similar section of a modified form of device; and

Fig. 3 is a vertical section showing my second form of devce mounted adjacent the front and rear portions of the vehicle.

In the drawings, wherein I have illustrated the preferred embodiments of my invention, 1 indicates the body of a motor vehicle the same being of any desired or preferred construction having a driver's seat 2 adjacent the front of the car, and an instrument or panel board 3 in front of the driver's seat, in the usual manner. 4 indicates the floor board of the vehicle.

Referring more particularly to Fig. 1, 5 indicates a hollow member preferably of the form shown and somewhat similar in shape to an L pipe fitting, said member adapted to have one end extend through an opening in the instrument board 3 and being secured thereto by the mounting bolts or screws 6. A closure 7 is hinged to one end of the fitting 5, as at 8, and there is a spring latch 9 between the parts 5 and 7 to releasably secure the closure member to the fitting.

The member 7 is preferably constructed with a rim or ring portion 10, in which a dial plate 11 is arranged, somewhat similar in appearance to the dials of the instruments on the instrument board. In this manner the obviousness of the device as an ash receiver is prevented so that the casual observer will assume that the device is one of the indicating devices of the vehicle.

A glass 12 may be arranged between the dial 11 and the rim 10, a portion of the glass being suitably roughened so that friction-matches may be drawn thereacross to ignite them. A cup-shaped tray member having a flat portion or bottom 13, is frictionally inserted in the rim member 10 and carried thereby, said bottom of the tray member bearing against the dial 11 to retain it and the glass 12 in place against accidental displacement. The rear wall or side of the tray is inclined as at 14, so that when the closure is in the open or as shown in the dotted line position, ashes may be dropped into the tray and when the closure member is moved to the full line position shown to close the member 5, the ashes in the cup will slide downwardly along the wall 14 and drop toward the bottom of the member 5.

Cigar or cigarette-receiving notches 15 and 16 may be provided in the tray, if so desired, whereby when the tray is in the position shown in dotted lines cigars or cigarettes may be supported in the notches.

A cup member 17 may be detachably secured to the bottom end of the fitting 5 by means of a bayonet joint engageable with the pins 18 or by any other suitable means so as to be quickly and easily removed from the fitting for the purpose of emptying, cleaning, or the like; or, if desired, the ashes dropped into the fitting may be conducted downwardly through the floor of the car so that they will drop onto the roadway. In the latter instance, a rigid or flexible pipe or duct 19 is attached at its upper end 20 to the member 5 in any suitable manner, as by bayonet joints, or the like, and if desired a false bottom or damper 21 may be interposed adjacent the end 20 of the pipe 19, the damper being operated by any suitable means, as, for instance, by a rod 22, operable from the instrument board.

From the foregoing description it is obvious that the device will be relatively inconspicuous on the instrument board, being substantially flush therewith, and that after the device is once installed very little attention need be paid to it, because all of the ashes dropped thereinto will collect in the removable bottom, if one is used, or in case the bottom 17 is dispensed with, all of the ashes will drop onto the false bottom 21, wherefrom they may be dislodged occasionally to fall through the pipe 19.

Of course, the false bottom or damper 21 may be dispensed with, but its use is desirable because it prevents the dust or dirt of the roadway from traveling upwardly through the pipe 19 and discharging through the end of the fitting 5, when open. Match-holders, cigar-lighters or other extraneous devices may be mounted upon or carried by the ash receiver, if so desired.

In the form shown in Figs. 2 and 3, the ash receiver is of a simplified construction and is not flush with the instrument board or panel. The receiver comprises a cup member 23 having a removable top closure 24 carried thereby and a pipe 25 leads from the lower part of the cup member 23, the same extending downwardly through the floor 4 of the motor vehicle. It is practically similar to Fig. 1 except that the panel flush mounting L section is omitted.

The ash receivers may be mounted at any suitable points in the vehicle, as for instance, adjacent the front or rear seats thereof and if desired a match box 26 may be arranged on the lid or cover 24 so as to be carried thereby. It is to be understood that the form of device shown in Fig. 1 may also be mounted in the rear of the seats, the discharge pipe being concealed behind the upholstering.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described, an ash receiver arranged to be substantially flush with the instrument board of a motor vehicle, and a discharge pipe communicating with said receiver and leading downwardly therefrom to beneath the floor of the vehicle and through which the ashes are discharged, said ash receiver being provided with a closure member so constructed as to have the appearance of an indicating instrument.

2. In a device of the kind described, an ash receiver adapted to be mounted on the instrument board of a motor vehicle comprising a movable closure member cooperating with one end of said receiver and substantially flush with the instrument board, a tray carried by said closure member on its inner side and movable into said receiver, a second closure in said receiver, whereby ashes may be dropped onto said tray when the closure member is in its open position, said ashes being discharged from said tray onto said second receiver when said closure member is moved to its closed position, means for manually operating said second closure to discharge said ashes from the vehicle.

3. In a device of the kind described, a hollow member of a substantial L shape having an open end insertable through a panel board so as to be substantially flush therewith, a closure member movably connected to said hollow member at said end, and tray means frictionally carried on said closure for receiving ashes therein when said cover is in its open position and having an inclined side wall upon which said ashes may slide downwardly into said hollow member to automatically dump said ashes into said hollow member while said cover is moved to its closed position.

4. In a device of the kind described, a hollow member having one end open and insertable through the instrument board of a motor vehicle so as to be substantially flush therewith, a closure member movable to control said open end of said hollow member and having a camouflaged member arranged across said closure member, a transparent plate between said camouflaged member and said open end of said closure member and a tray frictionally engageable between said closure member, and camouflaged member for retaining said dial and transparent member in place in said closure member, said tray adapted to receive ashes therein when open and having notches thereon for supporting a cigar, said tray having one wall thereof inclined so that the ashes therein will dump automatically into said hollow member when said closure member is moved to its closed position.

5. An ash receiver for a motor vehicle comprising an L-shaped hollow member, one end thereof arranged flush with the instrument board, an open ended bowl shaped member detachably secured to the opposite end of said L member and communicating with a discharge conduit which extends beneath the vehicle floor, said bowl shaped member provided with a pivotal closure operable from the instrument board.

6. An ash receiver for motor vehicles comprising an L-shaped hollow member, one end thereof arranged flush with the instrument board, a closure for said end carrying an ash receiving tray, a bowl shaped member detachably secured to the opposite end of said L member, a pivotally mounted plate carried in said bowl shaped member, and operating means for said plate extending to the instrument board.

In testimony whereof, I have hereunto signed my name in the presence of two subscribing witnesses.

ANDREW C. WOOD.

Witnesses:
Roy W. Hill,
Ruth M. Ephraim.